Nov. 8, 1932.  F. A. DELANO  1,886,445
CORRUGATED TRANSPARENT MATERIAL
Filed Dec. 26, 1928

Inventor
FREDERIC A. DELANO
By Semmes & Semmes
Attorneys

Patented Nov. 8, 1932

1,886,445

UNITED STATES PATENT OFFICE

FREDERIC A. DELANO, OF WASHINGTON, DISTRICT OF COLUMBIA

CORRUGATED TRANSPARENT MATERIAL

Application filed December 26, 1928. Serial No. 328,488.

My invention relates to transparent bodies, and more particularly to bodies of transparent material which permit an object to be clearly seen when viewed through said bodies in one direction, but cause an object to be distorted when viewed through the bodies in the opposite direction.

There are many places where natural light is desired together with privacy, not afforded by ordinary window glass. It is also ofttimes desirable to clearly see objects without, from within an interior, and yet restrict the view into the interior from the outside, without diminishing the intensity of light transmitted through the vision restricting medium.

Heretofore, glass and other transparent materials have been treated in various manners to prevent objects being clearly seen therethrough. The products have been rather successful in preventing objects being seen through the material, but have the disadvantage of materially reducing the intensity of light transmitted therethrough. Also, as yet, no entirely satisfactory products have been prepared that permit an object to be clearly seen, when viewed through the material in one direction and cause the object to be distorted when viewed through the material in the other direction.

An object of this invention is to devise a sheet of transparent material, that will permit an object to be clearly seen when viewed through the sheet in one direction and will cause the object to appear distorted when viewed through the sheet of material in the opposite direction.

Another object of this invention is to construct sheets of transparent material that will restrict vision through the same, but will transmit light without detrimentally decreasing its intensity.

Another object of this invention is to construct sheets of transparent material that permit an object to be clearly seen through the material in one direction but cause an object to be distorted when seen through the material in the opposite direction, and yet produce sheets of material that will not retain dust and dirt and that can be easily cleaned.

Another object of this invention is to produce panes of glass or other transparent material having an irregular surface that may be easily formed during the manufacturing process.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

This invention comprises the formation of bodies of transparent material, such as glass, into sheets, one surface of which is plane and the other surface of which is irregular. The irregular surface is formed of a plurality of plane surfaces in such a manner as to permit objects to be plainly seen through the sheets of transparent material, when viewed in one direction, and prevent objects being plainly seen through the material in the other direction. The plane surfaces forming the irregular surface are arranged at angles to each other in such a manner as to scatter the light rays passing through the sheets of material in one direction and thus cause objects seen therethrough to appear distorted.

This invention is also susceptible to modifications wherein curved surfaces are employed. In these modifications all of the surfaces may be curved or the surface may comprise alternate plane and curved surfaces. Also any desired combination of plane and curved surfaces may be employed.

In order to make my invention more clearly understood, I have shown in the accompanying drawing means for carrying the same into practical effect, without limiting the improvements in their useful applications to the particular constructions, which for the purpose of explanation, have been made the subject of illustration.

Figure 1:
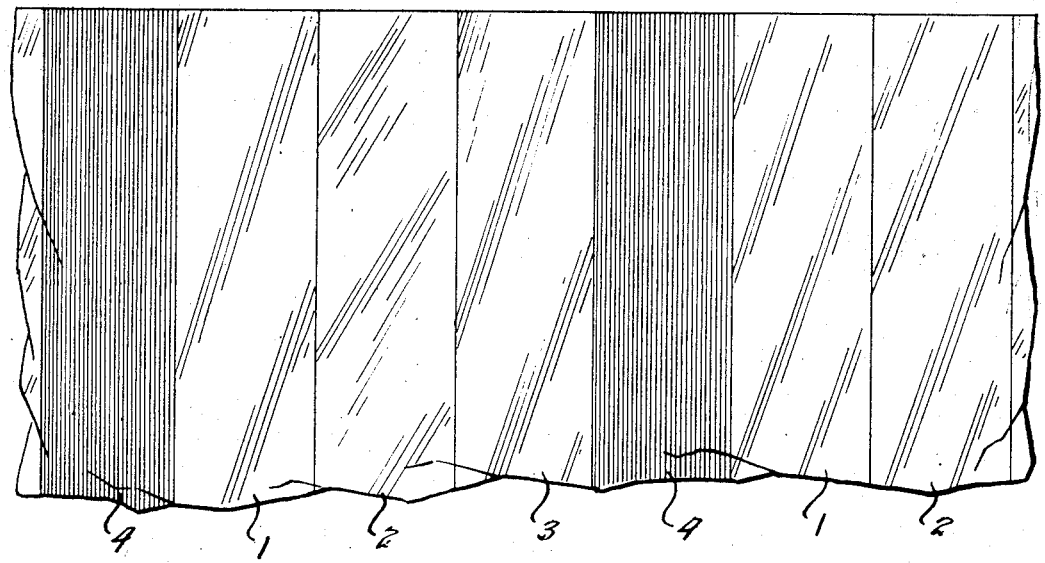
Figure 1 is a fragmentary plane view of a sheet of transparent material formed according to my invention.
Figure 2:
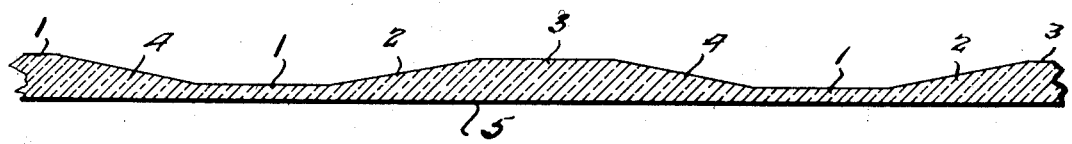
Figure 2 is a cross-sectional view of the sheet of material shown in Figure 1.

Referring to the drawing, Figures 1 and 2 show views of a fragment of a sheet of glass or other transparent material. It will be noted that one surface of the sheet of transparent material is flat and lies entirely in a single plane. The other side of the sheet of transparent material is not flat, but the surface thereof is corrugated as shown in the drawing.

By inspecting the several figures in the drawing, it can be seen, that the corrugations are formed of a plurality of small flat plane surfaces, arranged angularly to each other. In the form of my invention shown in Figures 1 and 2, the small plane surfaces are arranged in groups of four, each group comprising two surfaces arranged parallel to the large flat surface 5, and two surfaces arranged at an angle to the large surface 5.

The sheet of transparent material is so formed that surface 1 of each group is parallel to the large surface 5, and the material between surfaces 1 and 5 is relatively thin. Surface 3 is also parallelly arranged with respect to the large surface 5, but the material between surfaces 3 and 5 is relatively thick as compared to the material between surfaces 1 and 5. The width of the small plane surfaces forming the corrugated side of the sheet, are all preferably of the same dimensions so as to form a pleasing appearance and to produce the desired effects.

Plane surface 2 lies between surfaces 1 and 3 of the group and is angularly arranged thereto to properly connect these surfaces. Extending between the surface 3 of one group and the surface 1 of an adjacent group is the angularly arranged surface 4. Thus the corrugated surface is made up of groups of four plane surfaces, providing the whole surface with a plurality of small surfaces, alternate ones of which are parallel to the large plane surface 5.

While I have shown the plane surfaces in Figure 1 as being in a vertical plane, it is to be clearly understood that this is merely for the purpose of illustration and the conservation of space. A transparent body constructed in accordance with my invention is placed in its receiving member in such a manner that the intersections of the plane surfaces are in a horizontal plane.

Figure 3:
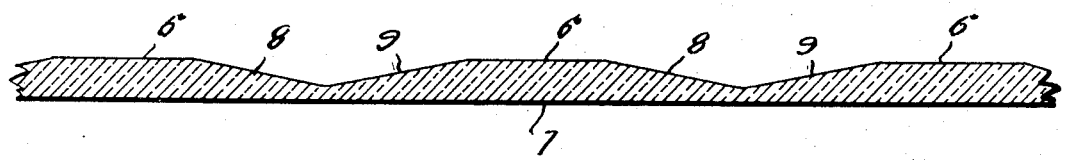
Figure 3 is a view similar to that shown in Figure 2, illustrating a modified form of my invention.

A somewhat modified form of my invention is shown in Figure 3. In this form of my invention the narrow plane surfaces, forming the corrugated surface, are arranged in groups of three. The plane surfaces 6, parallel to the large plane surface 7 are separated from each other by a pair of angularly arranged surfaces 8 and 9. This form is somewhat similar to the form shown in Figure 2 except that the surfaces parallel to the large flat surface are separated by two angularly arranged surfaces.

Figure 4:
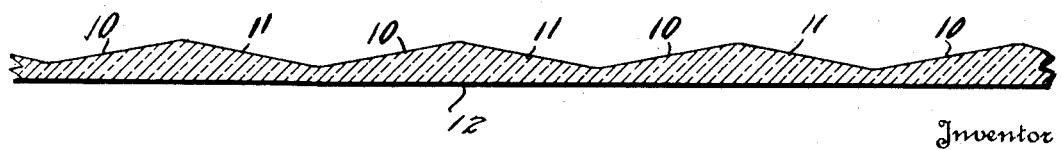
Figure 4 is another view similar to that shown in Figure 2, illustrating another modified form of my invention.

Still another modification of my invention is shown in Figure 4. In this form there are no surfaces parallel to the large flat surface. The corrugated surface is formed of a plurality of groups of two angularly arranged surfaces 10 and 11, both of which are equiangularly arranged with respect to the large flat surface 12.

Further modifications of this invention consist in the substitution of curved surfaces in place of the plane surfaces in each of the forms described. The substitution may be for all of the surfaces or for any particular surfaces. For instance, alternate surfaces may be plane, and those connecting the plane surfaces curved, or, there may be two or more plane surfaces between curved surfaces or two or more curved surfaces between plane surfaces.

While certain surfaces have been arranged in groups for purposes of description, it is obvious that the surfaces of each form can be arranged in different group combinations.

In all of the forms of my invention the width of the plane surfaces of the corrugations are equal, and the thickness of similar portions of the pane or sheet of material are equal, thus providing a uniform product which will produce the desired optical effects and be pleasing in appearance.

The angles between the small plane surfaces forming the corrugated surface, will vary, depending upon the results desired, and the refractive index of the transparent material employed.

The sheet of material may be constructed of the materials commonly used for window panes and other similar purposes, such as glass, and other transparent materials. The sheets of the transparent material may be formed by any of the methods employed for working similar materials such as by moulding, pressing, rolling or grinding.

In the operation of this invention transparent material, such as glass, constructed into one of the forms shown in drawing, may be placed in windows, doors, partitions or other places, where needed. It is preferable to so place the panes that the corrugations will be arranged horizontally and so that the corrugated side will be on the inside of the room, or adjacent the person who wishes to see others without being clearly seen by other persons.

A person close to the window, such as one would be in a room, can look through the parallel portions of the glass and see objects on the outside, such as on the street, clearly; whereas people on the street cannot see into the room without the image of the person in the room appearing distorted. Practically the same effect can be obtained with the form of my invention shown in Figure 4, because with the eye close to the window and on the corrugated side, the distortion effect does not operate as it does when an eye, at a distance and on the smooth side, looks through the window. The effects just described can be obtained with angles between the small plane surfaces, close to 180°.

Somewhat different results can be obtained by varying the angles between the small plane surfaces of the forms shown in Figures 2 and 3. By forming the material so that the planes 2, 4, 8 and 9 would be at an angle to the large flat surfaces, equal to the angle of total reflection, light from an object on the smooth side of the glass would be totally reflected by the angularly arranged planes, but would pass through the parallel planes undistorted. With such an arrangement, objects on the smooth side could be seen by an eye on the corrugated side and would appear as though a grating were in front of the object. Such a grating, however, would not prevent the object from being clearly distinguished.

When light from an object on the corrugated side falls on the sheet of material, the portion of the light passing through the angularly arranged planes interferes with that passing through the parallel planes, and the object appears highly distorted to an eye on the smooth side of the window.

It is obvious that my invention is susceptible to many modifications such as can be obtained by varying the relations and arrangements of the planes forming the corrugated surfaces.

The merits of my invention are obvious in that it provides sheets of transparent material which permit objects outside of a window to be fairly clearly seen, whereas objects inside the window cannot be seen from without except in a highly distorted condition. The products manufactured according to my invention successfully restrict the view through transparent material in one direction but permit light to pass therethrough without diminishing its intensity.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A body of transparent material having a flat plane surface on one side, and an irregular surface on the other side said irregular surface comprising a plurality of small plane surfaces, arranged in groups of three, each group consisting of a surface parallel to said flat plane surface, and forming the thickest portion of the material and being of sufficient width to permit vision therethrough when an observer is relatively close but of insufficient width to permit vision when an observer is relatively distant and two surfaces arranged angularly thereto.

2. A body of transparent material having a flat plane surface on one side and an irregular surface on the other side said irregular surface comprising a plurality of small plane surfaces arranged in groups of three, each group consisting of a surface parallel to said flat plane surface and forming the thickest portion of the material and being of sufficient width to permit vision therethrough when an observer is relatively close but of insufficient width to permit vision when an observer is relatively distant and two irregularly arranged surfaces tapering in the direction of said flat surface.

3. A body of transparent material having a flat plane surface on one side and an irregular surface on the other side said irregular surface, comprising a plurality of small plane surfaces arranged in groups of three, each group consisting of a surface parallel to said flat plane surface and forming the thickest portion of the material, and being of sufficient width to permit vision therethrough when an observer is relatively close but of insufficient width to permit vision when an observer is relatively distant and two surfaces arranged angularly thereto, each of said groups joining an adjacent group at the junction of the angularly arranged surfaces.

4. A window pane comprising a transparent material having a continuous flat plane surface on one side, and an irregular surface on the opposite side; the irregular surface comprehending a series of flat surfaces parallel to the said flat plane surface and extending completely and uninterruptedly across one dimension of the plane, and being of sufficient width to permit vision therethrough when the observer is relatively close, but of insufficient width to permit vision when the observer is relatively distant; said series of parallel flat surfaces being laterally spaced apart and being joined by flat surfaces which are non-parallel, to the said continuous flat surface, and which are of prismatic function.

In testimony whereof I affix my signature.

FREDERIC A. DELANO.